United States Patent [19]

Newman, Sr. et al.

[11] Patent Number: 5,316,264
[45] Date of Patent: May 31, 1994

[54] FLOW-THROUGH TELESCOPING POLE

[76] Inventors: Robert D. Newman, Sr.; Robert D. Newman, Jr., both of P.O. Box 377, Greenwood, Mo. 64034

[21] Appl. No.: 87,279

[22] Filed: Jul. 7, 1993

[51] Int. Cl.$^5$ .............................................. F16K 5/00
[52] U.S. Cl. ................................... 251/150; 137/899; 285/178; 285/302
[58] Field of Search ................. 251/142, 150; 137/899; 285/178, 302

[56] References Cited

U.S. PATENT DOCUMENTS

| | | | |
|---|---|---|---|
| 1,553,164 | 9/1925 | Hook | 251/150 |
| 2,008,574 | 7/1935 | Bock | 251/150 |
| 3,837,689 | 9/1974 | Csatlos | 285/302 |
| 3,942,826 | 3/1976 | Lester | 285/178 |
| 4,071,266 | 1/1978 | Mountford | 285/302 |
| 4,650,224 | 3/1987 | Smith | 137/899 |

FOREIGN PATENT DOCUMENTS 2566506 12/1985 France .................. 285/302
98886 11/1961 Norway ................. 285/302

*Primary Examiner*—A. Michael Chambers
*Attorney, Agent, or Firm*—Hovey, Williams, Timmons & Collins

[57] ABSTRACT

A flow-through telescoping pole apparatus is provided for use in dispensing fluid from a suitable fluid source, such as a common garden hose. The apparatus includes an elongated hollow outer pole and an inner pole received in the outer pole for axial telescoping movement. A seal is provided in the space between the inner and outer poles to prevent leakage of fluids from between the poles. A locking assembly is also provided, and permits the inner pole to be locked against axial movement relative to the outer pole. The locking assembly includes a cam mounted on the inner pole and a friction member supported between the cam and the outer pole. The cam pinches the friction member against the outer pole when the inner pole is rotated relative to the outer pole to lock the axial position of the inner pole.

8 Claims, 2 Drawing Sheets

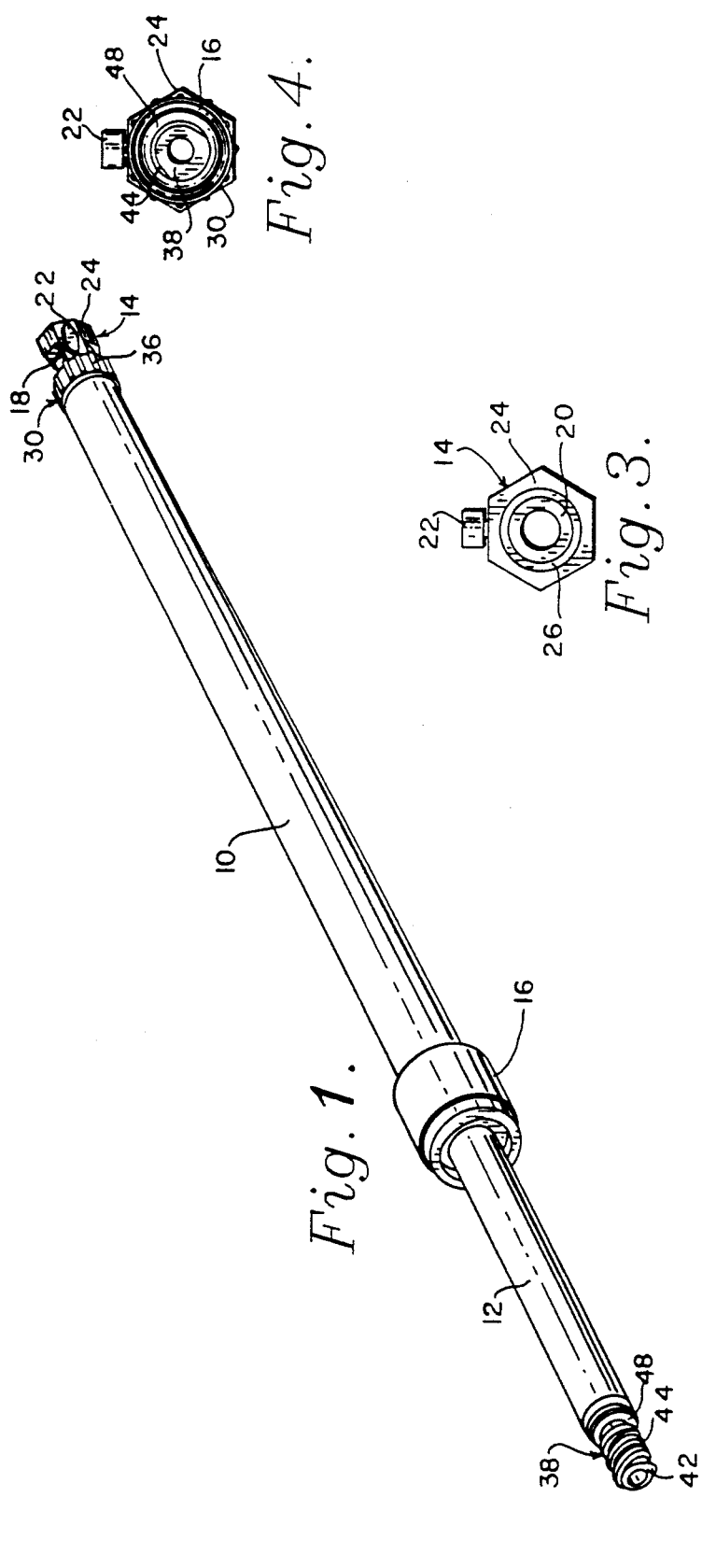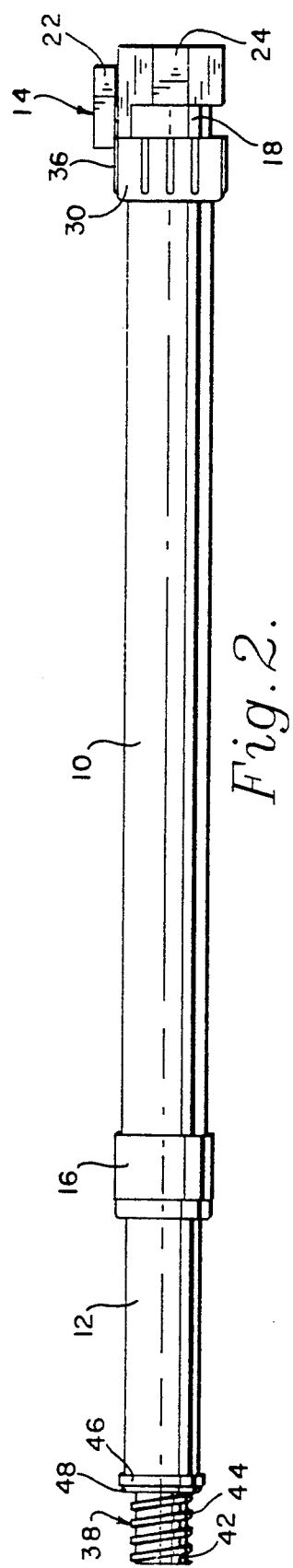

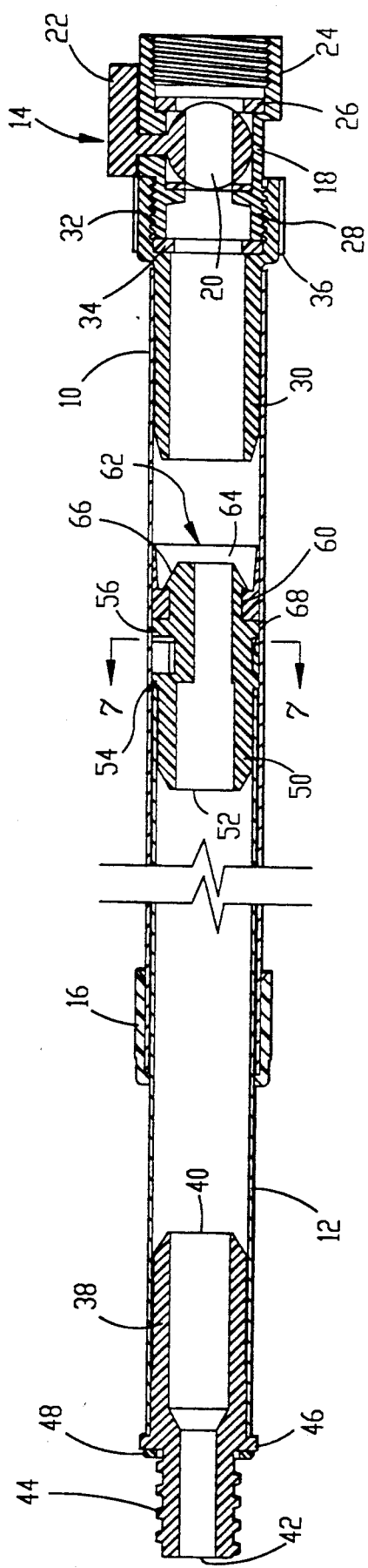
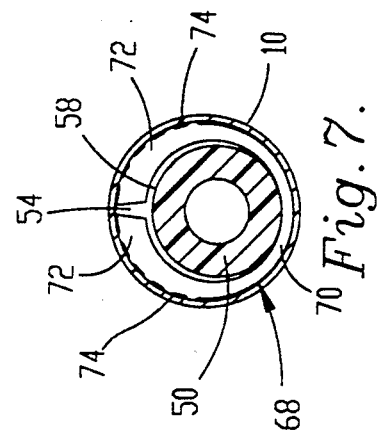
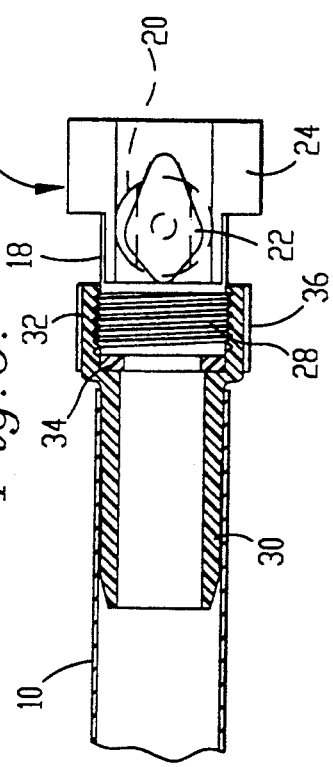

FLOW-THROUGH TELESCOPING POLE

BACKGROUND OF THE INVENTION

1. Field of the Invention

The present invention relates generally to fluid handling equipment and, more particularly, to a telescoping pole apparatus through which fluid can be delivered to any suitable fluid dispensing attachment.

2. Discussion of the Prior Art

It is known to provide a flow-through telescoping pole provided with an outer pole, an inner pole telescopically received within the outer pole, and a locking mechanism for fixing the relative axial position of the inner pole once it has been adjusted to a desired length. According to this known construction, the locking mechanism includes a collet provided on the distal end of the outer pole which, when rotated, presses an intermediate member against the inner pole so as to pinch the inner pole to hold it in place axially against further telescoping movement. However, several drawbacks exist to the use of this construction.

For example, in using the known construction, the inner pole must first be positioned relative to the outer pole, and then retained in this position while the collet is rotated to lock the inner pole in place. This operation is cumbersome since the user must support both poles relative to one another while tightening the collet. Frequently, two hands are not quite enough to accomplish the task, especially when fluid is flowing through the pole.

OBJECTS AND SUMMARY OF THE INVENTION

It is an object of the present invention to provide a flow-through telescoping apparatus which allows a user to extend the reach of the apparatus several feet in order to spray or dispense fluid at hard to reach or elevated locations.

It is another object of the present invention to provide a pole apparatus with a locking means for locking the relative axial position of a pair of poles forming the apparatus so that the apparatus may be adjusted to any desired length and then locked against additional unwanted axial movement.

In accordance with these and other objects evident from the following description of a preferred embodiment of the invention, a flow-through telescoping pole apparatus includes elongated hollow outer and inner poles, wherein the inner pole is received in the outer pole for axial telescoping movement. A female connector is provided for connecting the pole apparatus to a source of fluid, and a fluid passageway extends completely through the apparatus so that fluid flows through the poles and is dispensed. A sealing means seals the space between the inner and outer poles to prevent leakage of fluids from between the poles, and a locking means is provided for locking the axial position of the inner pole relative to the outer pole. The locking means includes a cam mounted on the inner pole and a friction member supported between the cam and the outer pole. The cam and friction member are movable together on the inner pole during relative axial movement between the inner and outer poles, the cam pinching the friction member against the outer pole when the inner pole is rotated relative to the outer pole to lock the axial position of the inner pole.

By providing this construction, numerous advantages are obtained. For example, by providing a locking means which locks the relative axial position of the inner and outer poles when one of the poles is twisted, it is much easier to manipulate the locking means than is possible with conventional devices, and locking may be easily accomplished with two hands while supporting the inner and outer poles in a desired axial orientation.

In addition, by sealing the space between the inner and outer poles while allowing relative axial adjustment therebetween, an apparatus results which is extendable between a compact retracted position useful for storing the apparatus, and any of a number of different extended use positions.

BRIEF DESCRIPTION OF THE DRAWING FIGURES

A preferred embodiment of the present invention is described in detail below with reference to the attached drawing figures, wherein:

FIG. 1 is a perspective view of a flow-through telescoping pole apparatus constructed in accordance with the preferred embodiment;

FIG. 2 is a side elevational view of the apparatus;

FIG. 3 is an outlet end elevational view of the apparatus;

FIG. 4 is an inlet end elevational view of the apparatus;

FIG. 5 is a sectional view of the apparatus taken along line 5—5 of FIG. 4;

FIG. 6 is a fragmentary top plan view, partially in section, of the inlet end of the apparatus; and FIG. 7 is a sectional view taken along line 7—7 of FIG. 5.

DETAILED DESCRIPTION OF THE PREFERRED EMBODIMENT

A flow-through telescoping pole apparatus constructed in accordance with the preferred embodiment is illustrated in FIG. 1 and broadly includes an elongated hollow outer pole 10, and an elongated hollow inner pole 12 received in the outer pole for axial telescoping movement.

The outer pole 10 is preferably formed of aluminum tubing or the like having an exemplary diameter of one inch. The tubing is provided with opposed axial ends, and is hollow intermediate the ends to define a flow passageway through the pole. A valve assembly 14 is provided at one end of the outer pole for controlling fluid flow through the pole apparatus. A collar 16 is secured to the opposite end of the outer pole, and protects the outer pole against deformation which might normally prevent the inner pole from being telescoped into and out of the outer pole. In addition, the collar assists in retaining the inner pole within the outer pole by presenting an inner circumferential edge that is sized slightly smaller than the inner diameter of the outer sleeve.

As shown in FIG. 5, the valve assembly includes a cylindrical housing 18 defining a fluid passageway, and a ball valve 20 positionable within the passageway and rotatable between a flow-permitting position, as shown in FIG. 3, and a flow-preventing position angled 90° relative to the first position. As shown in FIG. 6, when the ball valve is rotated 90° from the flow-permitting position, the passageway through the ball is oriented transverse to the passageway through the housing 18. A handle 22 is connected to the ball valve and extends through the housing to enable a user to move the ball valve between the flow-permitting and flow-preventing positions.

Returning to FIG. 5, one axial end of the housing defines an inlet to the apparatus, and is provided with a threaded female connector 24 sized for receipt on a ordinary garden hose. A conventional seal 26 is positioned within the connector for preventing leakage when the apparatus is connected to the hose.

The opposite axial end of the housing is provided with a threaded male connector 28 which permits the valve assembly to be attached to and removed from the apparatus. By providing this arrangement, it is possible to remove the valve assembly completely from the apparatus, if not needed for a particular application.

The valve assembly is retained on the outer pole by a spud 30 including a first axial end having a threaded female connector 32 sized to receive the male connector 28 of the valve assembly. A seal 34 similar to the seal 26 is provided between the assembly 14 and spud 30 to prevent leakage from the apparatus at this connection. A plurality of longitudinally extending ridges 36 are formed on the threaded female connector of the spud for expediting threading of the assembly 14 onto the apparatus. The end of the spud opposite the connector 32 is tapered to facilitate assembly of the spud on the outer tube, and the spud is hollow to define a fluid flow passageway therethrough.

The inner pole 12 is also formed of aluminum tubing or the like, but is of a diameter smaller than the diameter of the outer pole. For example, where a one inch diameter tubing is used to form the outer pole, a ⅞ inch diameter tubing is used for the inner pole. One axial end of the inner pole, which defines an output end of the apparatus, is fitted with a hollow threaded end member 38 provided with a fluid flow passageway through which fluid is discharged from the apparatus. As shown in FIG. 4, a fluid flow passageway extends completely through the apparatus from the inlet end defined by the female connector 24 to the outlet end defined by the end member 38 so that, when the valve is opened, fluid is directed through the apparatus and is discharged to a location controlled by the user.

The end member 38 includes a first end 40 which is tapered to facilitate assembly of the member on the inner tube, and a second axial end 42 provided with external threading 44 adapted to receive a fluid dispensing attachment such as an ordinary sprinkler head or hollow flow-through cleaning brush. A circumferential flange 46 extends radially outward from the end member at a point intermediate the opposed ends thereof, and defines a shoulder against which the inner pole abuts. A seal 48 is provided on the member 38 adjacent the threaded end to prevent leakage from between the member and the fluid dispensing attachment.

The opposite end of the inner pole is provided with a sealing means for sealing the space between the inner and outer poles to prevent leakage of fluids from between the poles. In addition, a locking means is provided for locking the axial position of the inner pole relative to the outer pole at any desired relative axial position.

The sealing means and locking means are both incorporated on a fitting 50 connected to one end of the inner pole 12. The fitting is of hollow, generally tubular shape, and includes a first axial end 52 that is tapered to facilitate insertion of the end into the end of the inner pole. A circumferential flange 54 is provided intermediate the ends of the fitting, and extends radially to define a shoulder against which the inner pole abuts. The diameter of the flange 54 is substantially equal to or slightly greater than the outer diameter of the inner pole. A second circumferential flange 56 is formed on the fitting and is spaced from the first flange so as to define a channel therebetween. The second flange includes a diameter substantially equal to that of the first flange so that the channel is substantially isolated between the fitting and the outer pole.

The channel includes a circumferential surface 58 that is cylindrical but eccentric relative to the central longitudinal axis of the fitting 50. This surface 58 defines a cam forming a part of the locking means as described below. On an axial side of the second flange 56 opposite the channel, a circumferential groove 60 is formed in the fitting. This groove 60 is sized to receive an annular seal 62 which forms the sealing means. The seal includes an annular body that is retained in the groove, and an axially extending wiper 64 that presses against the inner surface of the outer pole to prevent leakage between the two poles. The seal 62 is preferably formed of a resilient material such as rubber.

The end of the fitting 50 adjacent the circumferential groove 60 is tapered to facilitate assembly of the seal 62 on the fitting, and a small ridge 66 extends radially beyond the groove to hold the seal in place once positioned in the groove.

The locking means includes a friction member 68 positioned on the fitting and interposed between the eccentric surface 58 and the outer pole 10. The friction member 68 is shown in FIG. 7, and includes a C-shaped ring defining a bight 70 and opposed ends 72. The ring 68 has a variable radial thickness that is less at the bight 70 than at the ends 72, and a plurality of ribs 74 are formed in the outer circumferential surface of the ring adjacent the ends.

During operation, once the inner pole 12 is extended to a desired position relative to the outer pole 10, the user simply twists the inner pole relative to the outer pole, causing the outermost radius of the eccentric surface 58 to rotate from a position adjacent the bight of the ring, as shown in FIG. 7, to a position engaged with the ends 72 of the ring. As the cam defined by the channel surface reaches this locking position, the surface forces the ends 72 of the ring radially outward into gripping engagement with the outer pole 10. In addition, once the cam reaches a position exactly intermediate the ends of the ring, the cam nests in the gap between the ends 72, providing a detent which indicates that the apparatus is locked against further axial movement.

When it is desired to adjust the telescoped position of the poles, the poles are twisted relative to one another to the position shown in FIG. 7, so that the inner pole is free to slide within the outer pole, and carries the ring with it.

Although the invention has been described with reference to the preferred embodiment illustrated in the attached drawing figures, it is noted that equivalents may be employed and substitutions made herein without departing from the scope of the invention as recited in the claims.

What is claimed is:

1. A flow-through telescoping pole apparatus for use in dispensing fluid from a source, the apparatus comprising:
   an elongated hollow outer pole;

an elongated hollow inner pole received in the outer pole for axial telescoping movement;

a female connection means for connecting the pole apparatus to the source of fluid;

a fluid passageway extending completely through the outer and inner poles to permit fluid flow through the apparatus;

a sealing means for sealing the space between the inner and outer poles to prevent leakage of fluids from between the poles; and a locking means for locking the axial position of the inner pole relative to the outer pole, the locking means including a cam mounted on the inner pole and a friction member supported between the cam and the outer pole, the cam and friction member being movable together on the inner pole during relative axial movement between the inner and outer poles, the cam pinching the friction member against the outer pole when the inner pole is rotated relative to the outer pole to lock the axial position of the inner pole.

2. A flow-through telescoping pole apparatus as recited in claim 1, further comprising a fitting supported on the inner pole within the outer pole, the fitting including an eccentric outer surface which defines the cam, and a pair of opposed walls extending between the outer surface and the outer pole for retaining the friction member on the fitting during relative axial movement between the inner and outer poles.

3. A flow-through telescoping pole apparatus as recited in claim 2, wherein the friction member includes a C-shaped ring defining a bight and opposed ends, the ring having a variable radial thickness that is less at the bight than at the ends of the ring.

4. A flow-through telescoping pole apparatus as recited in claim 2, wherein the sealing means includes an annular seal supported on the fitting and engaged with the outer pole.

5. A flow-through telescoping pole apparatus as recited in claim 1, further comprising a threaded end member supported on the inner pole opposite the fitting for permitting attachment of the pole apparatus to a fluid dispensing attachment.

6. A flow-through telescoping pole apparatus as recited in claim 2, wherein the fitting includes opposed axial ends which are tapered to facilitate assembly of the fitting on the apparatus.

7. A flow-through telescoping pole apparatus for use in dispensing fluid from a source, the apparatus comprising:

an elongated hollow outer pole;

an elongated hollow inner pole received in the outer pole for axial telescoping movement;

a female connection means for connecting the pole apparatus to the source of fluid;

a valve means for controlling fluid flow through the pole apparatus, the valve means including a valve movable between a flow permitting position and a flow preventing position, and a handle for moving the valve;

a sealing means for sealing the space between the inner and outer poles to prevent leakage of fluids from between the poles; and a locking means for locking the axial position of the inner pole relative to the outer pole, the locking means including a cam mounted on the inner pole and a friction member supported between the cam and the outer pole, the cam and friction member being movable together on the inner pole during relative axial movement between the inner and outer poles, the cam pinching the friction member against the outer pole when the inner pole is rotated relative to the outer pole to lock the axial position of the inner pole.

8. A flow-through telescoping pole apparatus as recited in claim 7, wherein the valve means is supported on the outer pole.

* * * * *